United States Patent [19]

Gilbert

[11] Patent Number: 5,128,593
[45] Date of Patent: Jul. 7, 1992

[54] POWER SUPPLY FOR GAS-FILLED LAMPS

[75] Inventor: John A. Gilbert, Upland, Calif.

[73] Assignee: Beckman Instruments, Inc., Fullerton, Calif.

[21] Appl. No.: 470,010

[22] Filed: Jan. 25, 1990

[51] Int. Cl.[5] ............................................. H05B 41/24
[52] U.S. Cl. .................................... 315/287; 315/244; 315/209 R; 315/DIG. 7
[58] Field of Search ................ 363/26, 15; 315/291, 315/227 R, 283, 200 R, 287, 209 R, 244, 307, DIG. 7

[56] References Cited

U.S. PATENT DOCUMENTS

| | | | |
|---|---|---|---|
| 3,851,239 | 11/1974 | Suzuki | 363/15 |
| 3,879,649 | 4/1975 | Durecka | 363/15 |
| 4,128,868 | 12/1978 | Gamble | 363/26 |
| 4,139,805 | 2/1979 | Cosco et al. | 315/241 |
| 4,240,009 | 12/1980 | Paul | 315/224 |
| 4,358,712 | 11/1982 | Filgas, Jr. et al. | 315/243 |
| 4,442,382 | 4/1984 | Fleck | 315/287 |
| 4,677,534 | 6/1987 | Okochi | 363/26 |
| 4,692,667 | 9/1987 | Nilssen | 315/244 |
| 4,725,937 | 2/1988 | Kenny | 363/26 |
| 4,730,147 | 3/1988 | Kroening | 315/100 |
| 4,749,916 | 6/1988 | Yamazaki et al. | 315/254 |
| 4,806,830 | 2/1989 | Ueki | 315/209 R |
| 4,829,415 | 5/1989 | Haferl | 363/26 |
| 4,843,532 | 6/1989 | Freedman | 363/26 |
| 4,885,675 | 12/1989 | Henze | 363/26 |
| 4,897,522 | 1/1990 | Bilczo | 363/26 |

OTHER PUBLICATIONS

"Voltage Regulation for a DC/DC Convertor" IBM Technical Disclosure Bulletin vol. 17 No. 3 Aug. 1974.
Relevant pages from "Characteristics and Use of Deuterium Lamps", publication of *Hamamatsu TV Co., Ltd.*

Primary Examiner—Eugene R. LaRoche
Assistant Examiner—A. Zarabian
Attorney, Agent, or Firm—William H. May; P. R. Harder; Wen Liu

[57] ABSTRACT

A direct current power supply which incorporates an alternating current circuit segment so as to enable the use of a reactive component as an impedance limiting circuit element. The alternating current is produced by pulse width modulation regulation of raw direct current and DC to AC inversion. A feedback circuit is provided to regulate the pulse width modulation in accordance with the direct current output by the power supply so as to obtain a desired output current.

13 Claims, 2 Drawing Sheets

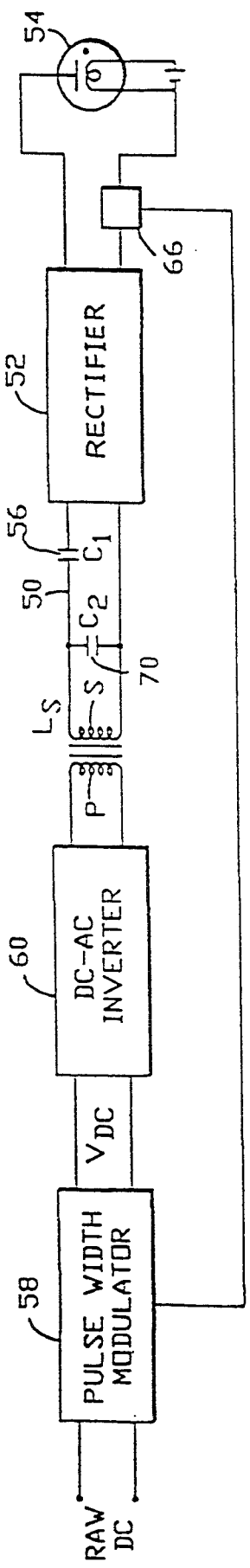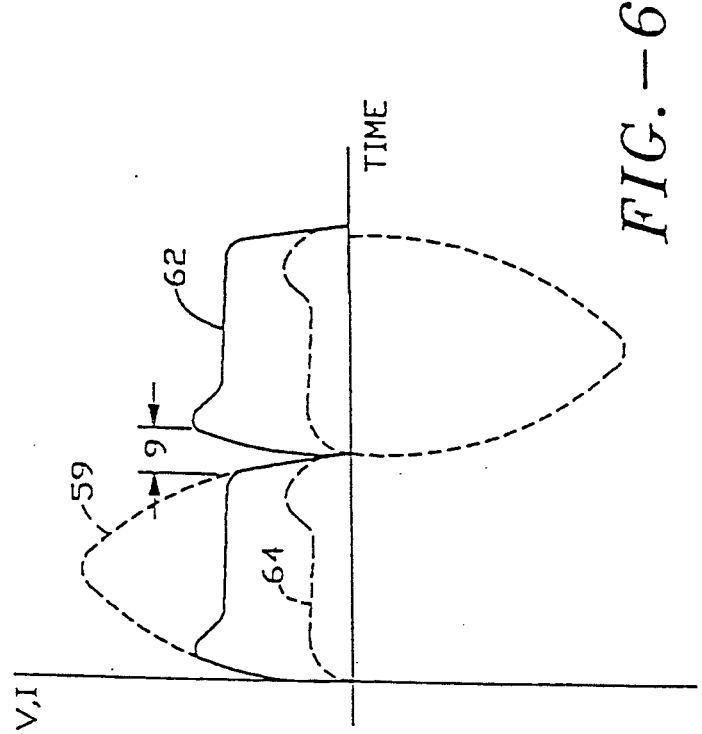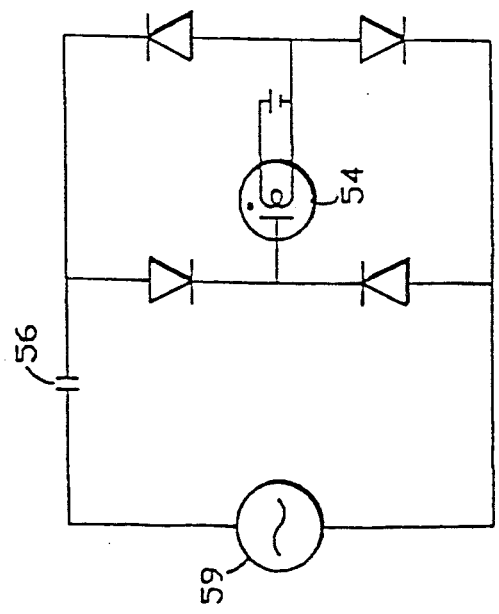
FIG.-4
FIG.-6
FIG.-5

POWER SUPPLY FOR GAS-FILLED LAMPS

BACKGROUND OF THE INVENTION

1. Field of the Invention

The present invention relates to power supplies and more particularly to power supplies for energizing gas-filled lamps.

2. Description of Related Art

Gas-filled lamps, also referred to as gas-discharge lamps, have long been used in spectrophotometers for measuring the spectral transmission characteristics and spectral absorption coefficients, etc. of materials. By analyzing the spectral properties, one could detect, characterize, identify as well as determine the concentration of the material. Deuterium lamps which have a high output in a stable, continuous spectrum in the ultraviolet region are widely used in spectrophotometers. In general, the spectral frequency or wavelength of the ultraviolet output of the deuterium lamp is dependent upon the current but not the power supplied to the lamp.

DC (direct current) operation of deuterium lamps is most common. FIG. 1 shows a basic deuterium lamp DC power circuit used in the past for energizing deuterium lamps. The deuterium lamp 10 is schematically illustrated as having two electrodes 12 and 14 enclosed by a deuterium gas-filled bulb. One of the electrodes is an anode 12 and the other a cathode 14. The cathode 14 is in the form of a filament. The basic operation of the deuterium lamp 10 requires a DC voltage source 15 of a sufficient voltage level to be momentarily applied across the electrodes 12 and 14 to trigger ionization of the deuterium gas in the space between the electrodes thereby initializing gas discharge. Thereafter, current flows relatively freely through the ionized gas between the electrodes 12 and 14, with electrons flowing from the cathode 14 to the anode 12 under the influence of the applied voltage potential, which is substantially less than the triggering voltage as will be explained in greater detail below. The interaction of the electrons and the gas ions causes further discharge thereby sustaining the operation of the deuterium lamp.

A small power supply 16 is applied to the ends of the cathode filament 14. The cathode filament 14 serves two functions. It heats the cathode and thereby stimulates thermionic emission of electrons and subsequent gas discharge. It is also used to initially warm up the cathode prior to the initial gas discharge in order to protect the cathode from ion bombardment damage. As is known to those familiar with deuterium lamps, cathode temperature is a critical factor in determining lamp performance.

FIG. 2 shows the typical voltage-current characteristic of a deuterium lamp. The lamp 10 in FIG. 1 follows such a characteristic. Once the gas has ionized, the voltage required to sustain the lamp is significantly less than the triggering voltage. The lamp 10 exhibits a non-constant negative resistance characteristic line 20 along which current increases and voltage decreases upon triggering of the lamp 10. As can be seen from the graph of FIG. 2, initially a high voltage but low current pulse is required to ionize the gas and subsequently a low voltage high current constant supply is required to sustain the operation of the lamp. For the circuit shown in FIG. 1 which uses a single power source 15 for energizing the lamp 10, in order to satisfy the above requirements, a series DC load impedance is provided by way of a resistor 18 which exhibits a voltage-current characteristic represented by the load line 22 in FIG. 2. The impedance matches the lamp operating impedance to the output voltage of the power source 15. The point of intersection A of the impedance load line 22 and the lamp voltage-current characteristic line 20 represents an unstable operating point once gas ionization has started, and the point of intersection B represents a stable operating point at which the deuterium lamp 10 sustains its discharge at the rated voltage and current.

The above described power supply circuit has several drawbacks. It can be appreciated that the series impedance must be chosen precisely to match the lamp current and voltage at the operating point B. Any variation in the load impedance will cause a change in the current supplied to the lamp 10 thereby changing the spectral wavelength output of the lamp at the operating point B. This is undesirable for spectrophotometer operations which typically require lamp outputs of constant wavelength for consistent spectral analysis.

The transition from trigger point A to stable operating point B should be smooth, which is difficult to obtain in the prior art circuit. The load line 22 from point A to point B does not track the voltage-current characteristic 20 of the lamp. Thus one faces the risks of either the gas deionizing thereby turning off the lamp or overloading the lamp thereby shortening the life of the lamp.

Another drawback of the power supply circuit shown in FIG. 1 is its inefficiency. For example, a 27 watt deuterium lamp rated at a trigger voltage of 600 V and a stable operation at 90 V and 0.3 A current requires a series resistance of 1700 ohms to match the voltage-current characteristic of the lamp. Such a power supply is very inefficient, requiring a large 180 watt DC supply in order to be able to provide the 600 V trigger voltage and 0.3 A lamp sustaining current to drive the 27 watt lamp, an efficiency of 15%. The large power supply is bulky and increases the cost of the spectrophotometer. A substantial amount of heat is dissipated by the series resistor 18, accounting for most of the 85% loss in efficiency. This heat could affect surrounding circuit components.

Another power supply circuit used in the past is shown in FIG. 3. Prior to triggering the lamp 30, the switch 34 is set at the position shown by the dotted line 36 so that the high voltage DC source 31 charges a capacitor 32 to an energy level sufficient for triggering the lamp. Thereafter, the switch 34 disconnects the capacitor charging circuit and closes the triggering circuit. The capacitor discharges, triggering the operation of the lamp 30. Thereafter a constant current DC power supply 38 continues to provide power through a series load resistor 40 for sustaining operation of the lamp 30 at the rated current. The sustaining voltage requirement of the power source 38 is much lower in this circuit than that shown in FIG. 1. The series impedance value can be reduced in this circuit to between 100 and 150 ohms for a typical 0.3 A, 90 V lamp. Efficiency is increased significantly over the circuit of FIG. 1 to as high as 50%. However, since the efficiency is a function of the input voltage of supply 38, it may drop below 35% for high values of supply input voltage.

While the efficiency has increased for the power supply of FIG. 3, it requires, however, two separate power sources to perform the functions of triggering and sustaining the lamp operation. Like the circuit shown in FIG. 1, the load resistor 40 of this circuit has to be chosen carefully to match the operating point B along the voltage-current characteristic 20 of the lamp. It is difficult to control a smooth transition from trigger point A to operating B when switching from the trigger DC source 31 to the current supply 38. If the impedance value changes at the lamp's operating point B, e.g. caused by circuit component deterioration or drift due to aging or temperature effect, current will change thereby causing changes in the spectral frequency output. If the current delivered to the lamp exceeds its rating, the life of the lamp will be shortened. Moreover, since the cathode temperature affects the lamp current, it would be desirable to provide a means of regulating the current power supply to provide a constant current to the deuterium lamp at its stable operating point to produce a constant spectral output.

SUMMARY OF THE INVENTION

The present invention is directed to a direct current power supply which incorporates an efficient low loss impedance to match operating load impedance to the power supply output voltage. In another aspect of the present invention, the power supply regulates the output current by feedback control. The power supply has high electrical power efficiency. It is suitable for use, for example, to energize gas-filled lamps such as deuterium lamps at high efficiency.

In a preferred embodiment, the power supply circuit incorporates an AC (alternating current) circuit segment so as to enable the use of an AC reactive element as matching load impedance. The AC is rectified to DC for energizing the deuterium lamp. A current sensor detects the current supplied to the lamp and feedback is provided to regulate the AC supply prior to rectification. To match the voltage-current characteristic of the lamp, the matching load impedance is provided within the AC segment of the power supply circuit by means of a low loss reactive element such as a capacitor. The capacitor provides circuit impedance without dissipating a significant amount of power. In a preferred embodiment, the AC is derived from pulse width modulated raw DC and DC-AC conversion using a resonant inverter. Feedback of the lamp current is to the pulse width modulator. The components of the power supply, i.e. the capacitor, resonant inverter and pulse width modulator, have high electrical efficiency which contributes to the high efficiency of the power supply.

BRIEF DESCRIPTION OF THE DRAWINGS

FIG. 4 is a block diagram of a power supply in accordance with one embodiment of the present invention.

FIG. 5 is a simplified circuit diagram of the power supply of FIG. 4.

FIG. 6 is a diagram showing the waveforms of the lamp voltage and current.

DESCRIPTION OF ILLUSTRATED EMBODIMENTS

The following description is of the best presently contemplated mode of carrying out the invention. This description is made for the purpose of illustrating the general principles of the invention and should not be taken in a limiting sense. The scope of the invention is best determined by reference to the appended claims.

The power supply in accordance with the present invention will be described in reference to deuterium lamps for use in spectrophotometers. It is understood that the power supply described may be used in other context for energizing other electrical load carrying equipments which require a constant current.

Figure 1:
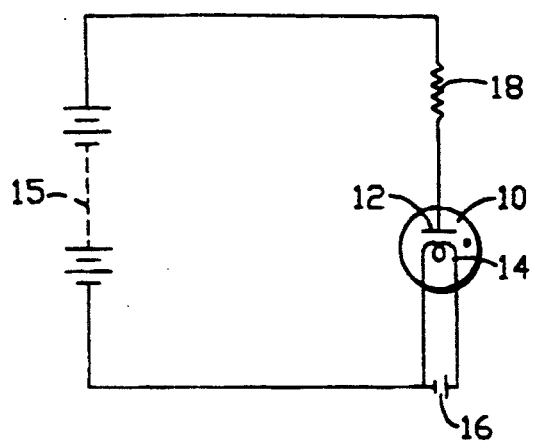
FIG. 1 is a circuit diagram of a prior art power supply for a deuterium lamp.
Figure 2:
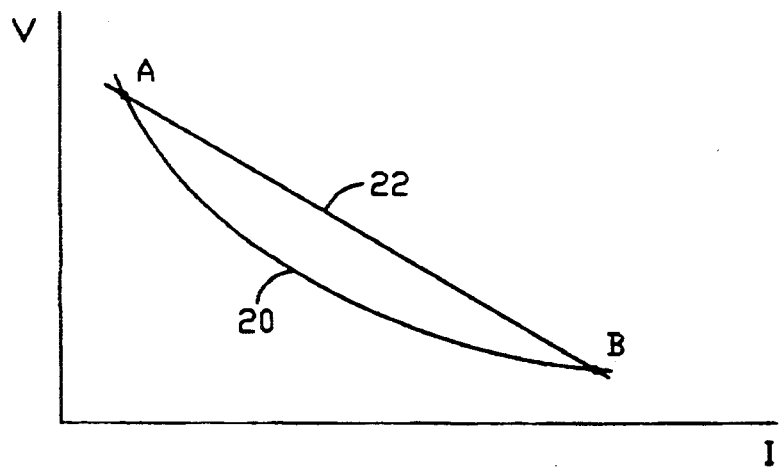
FIG. 2 is a graph illustrating typical voltage-current characteristics of a deuterium lamp and a load impedance of the prior art power supply circuit.

In one aspect of the present invention, a capacitor is used to provide the required impedance for matching the voltage-current characteristic of the deuterium lamp to the output voltage of the power supply so as to obtain a stable operating point such as point B shown in FIG. 2. Referring to FIG. 4, AC power 50 is rectified by a rectifier 52 to provide DC for energizing the deuterium lamp 54. A capacitor 56 of capacitance $C_1$ is connected in series along the AC line 50 to provide a load impedance. It can be appreciated that by using AC prior to final rectification to DC, the use of a low loss AC load impedance, i.e. the capacitor 56, is made possible which is otherwise not possible in the prior art DC circuits shown in FIGS. 1 and 3. Compared to the prior art power supply circuits, the use of high loss resistive elements such as resistors can be avoided. The capacitor 56 in the AC circuit functions like the resistor 18 or 40 in the DC circuits of FIGS. 1 and 3, but without the high energy loss associated with resistors. Accordingly, the efficiency of the power supply is increased.

FIG. 5 shows the basic circuit diagram of the power supply shown in FIG. 4. The rectifier is shown to be of the bridge type. FIG. 6 shows the waveforms of the AC 59 supplied to the capacitor 56, rectified but unfiltered lamp voltage 62 in the shape of unipolar half sine waves and current 64 at stable operating point B. It is noted that although the lamp is energized by pulses of DC from the rectifier circuit, it will remain ionized if the average DC component is high, i.e. the intervals g between the pulses are small compared to the period of waveform. The size of the interval g is dependent upon the frequency and amplitude of the AC voltage and the value $C_1$ of the capacitor 56. As can be seen from FIG. 6, the DC pulses are clipped at a magnitude set at the operating point of the lamp, e.g. 90 V, by appropriate selection of the value $C_1$ of the capacitor 56. By making the amplitude of the AC voltage sufficiently high and by appropriate selection of the AC operating frequency and the value of the capacitor, the minimum DC ionization potential each half cycle is maintained at a level sufficient to ensure continuous lamp gas ionization, so that the operation of the lamp is sustained at its stable operating point B despite the rectified unfiltered DC pulses 62 applied to the lamp. Although FIG. 6 shows that the current supplied to the lamp is also in pulses, the lamp output spectral wavelength will appear substantially constant to the sensing system of the spectrophotometer. This is because the power supply operates at substantially higher frequency than the sensing system. For example, the power supply operates at 23 kilohertz using a load capacitor of 6.8 NF and the sensing system operates with a bandwidth of DC to 60 Hertz.

In another aspect of the present invention, the AC is provided by pulse width modulation of raw DC using a pulse width modulator 58 and conversion to AC using a DC-AC inverter 60. The pulse width modulator 58 converts unregulated DC to regulated DC ($V_{DC}$). The width of the pulses determines the voltage amplitude of the AC output of the inverter 60. The pulse width modulator 58 is controlled to provide pulses of the desired pulse width and thus the desired AC output of the inverter 60. By controlling the pulse width modulator 58, the current 64 supplied to the lamp 54 is regulated. For the purpose of spectroscopy which requires a constant spectral output of the lamp, the pulse width modulator 58 is controlled to provide a substantially constant current to the lamp 54.

The DC-AC inverter 60 outputs an AC root-mean-square (RMS) voltage which is approximately 1.2 times the regulated DC output $V_{DC}$. It is preferred to include a resonance circuit at the output of the DC-AC inverter 60. The resonance circuit basically comprises a transformer 68 having primary P and secondary S windings, and a parallel capacitor. 70 of capacitance $C_2$. The ratio of the windings P and S is designed to provide a voltage across the secondary winding S of such a potential that meets the lamp trigger voltage requirements.

The transformer secondary winding S and the capacitors 56 and 70 form a parallel resonant "tank" circuit for the DC-AC inverter 60. Prior to lamp gas ionization, the resonance circuit consists of secondary winding (inductance $L_S$) and capacitor 70; whereby the DC-AC inverter operating frequency prior to lamp ignition is $f_1 = 1/[2\pi\sqrt{(L_S C_2)}]$. Subsequent to lamp gas ionization, the resonant circuit consists of secondary winding and both capacitors 56 and 70, whereby the DC-AC inverter operating frequency is $f_2 = 1/[2\pi\sqrt{[L_S(C_1 + C_2)]}]$. The transformer secondary winding S voltage remains essentially independent of lamp condition or inverter operating frequency.

In another aspect of the present invention, the control of the pulse width modulator 58 is by feedback from a current sensor 66 which senses the lamp current $I_L$. Since the voltage amplitude of the DC pulses 62 applied to the lamp is set by the capacitor 56, any variation in impedance of the lamp will cause a current change. The feedback signal regulates the pulse width modulator 58 to cause the inverter 60 resonance circuit and rectifier 52 to produce the desired substantially constant current $I_L$ at the operating point $V_L$ of the lamp 54. The lamp current $I_L$ is given by:

$$I_L = \frac{C_1(1.2V_{DC} - V_L)}{L_S(C_1 + C_2)}$$

A smooth transition of the energy supplied to the lamp from trigger to stable operating point is thus made possible.

The advantages of feedback control of the pulse width modulator 58 are apparent. By sensing the actual current supplied to the lamp 54, any drift in impedance caused by temperature effects, aging or deterioration of the circuit components and the lamp 54 is compensated for by the pulse width modulator 58 to ultimately obtain a substantially constant current at the output of the power supply. Moreover, by regulating with a pulse width modulator 58 and inverting to AC, the supply can be made to provide the high lamp trigger voltage as well as the low lamp sustaining voltage without a dual power source. By maintaining a constant current not exceeding the rating of the lamp, the life of the deuterium lamp is effectively extended. Furthermore, the feedback of the current sensor 66 enables the pulse width modulator 58 to smoothly transfer load current from zero at the high trigger voltage to set load current at the low sustaining voltage.

Figure 3:
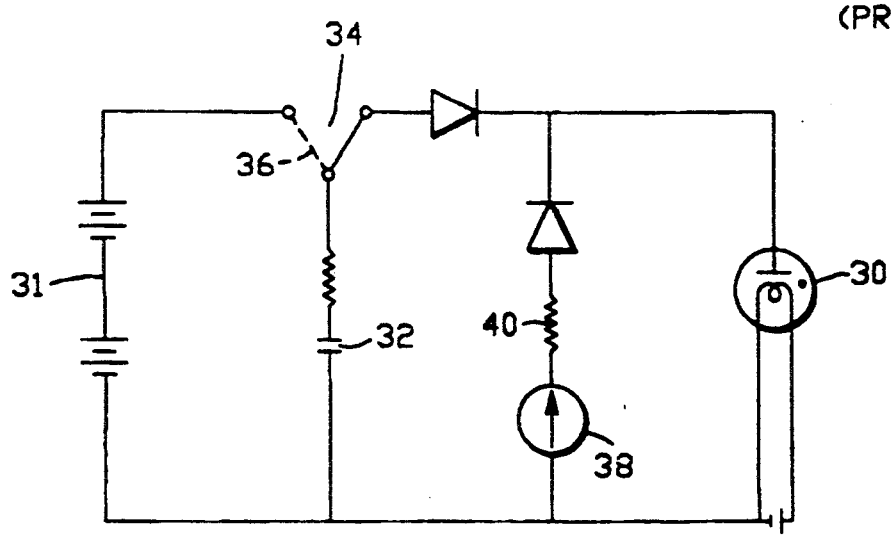
FIG. 3 is a circuit diagram of another prior art power supply for a deuterium lamp.

In summary a single power supply which provides a highly stable current, and thereby a stable lamp spectral output, and a greater overall power efficiency than prior art lamp power-supplies is described with reference to FIGS. 1 and 3. The improved efficiency arises from the use of a low loss reactive element in an AC segment of the power supply to match the operating point of the deuterium lamp, the use of the pulse width modulator 58 and resonant inverter 60 which are efficient circuit components, and the use of feedback control to regulate the pulse width modulator to obtain a constant current output. A further advantage of the power supply is its ability to operate under all load fault conditions. For example, in the event there is a shorted load condition, the regulated current still flows in the load circuit with no change in circuit losses or operating characteristics due to the presence of the capacitor which sets the upper limit in the load current. In the event of an open load condition, the multiple capacitor resonant inverter "tank" circuit continues to sustain normal circuit voltages.

It will also be appreciated that the power supply is able to operate a lamp designed for DC operation from rectified but unfiltered DC. If the lamp operated by the power supply is designated to run on AC, the rectifier can be omitted from the circuit.

While the invention has been described with respect to the preferred embodiments in accordance therewith, it will be apparent to those skilled in the art that various modifications and improvements may be made without departing from the scope and spirit of the invention. In particular, the power supply described can well be used to energize other types of equipment, machines or instruments other than deuterium lamps. Accordingly, it is to be understood that the invention is not to be limited by the specific illustrated embodiments, but only by the scope of the appended claims.

I claim:

1. A power supply for a gas discharge device comprising, a transformer having primary and secondary windings, the primary windings connected to an alternating current supply, the secondary winding having first and second legs, a first capacitor, $C_2$, connected across said two legs forming a first resonant circuit loop with said secondary winding at a time prior to downstream current use, a second capacitor, $C_1$, having two leads including a first lead connected to a first leg of the secondary winding, thereby forming a second resonant circuit loop with said secondary winding and the first capacitor during downstream current use, a full wave rectifier having two input terminals and two output terminals, the second lead of the second capacitor connected to one of the input terminals with the other input terminal connected to the second leg of said secondary winding, the two output terminals of the rectifier supplying direct current, a gas discharge device having a relatively high ionization voltage and a lower operating voltage, the discharge device connected across said two output terminals of the rectifier for drawing current from said second resonant circuit loop through said rectifier, the first resonant circuit loop developing a voltage adequate to ionize the gas discharge device and the second resonant circuit loop providing a reactive load for the device, maintaining the gas discharge, whereby the second resonant circuit loop provides a coarse control of current for the discharge device.

2. A direct current power supply as in claim 1 wherein the alternating current supply comprises:
means for supplying regulated direct current; and
means for converting the regulated direct current to alternating current supplied to said primary winding of the transformer.

3. A direct current power supply as in claim 2 further comprising:
means for sensing the direct current output from the rectifier; and
feedback means for controlling the means for supplying regulated direct current in accordance with the sensed direct current output so as to obtain a desired fine control of direct current in the discharge device.

4. A direct current power supply as in claim 3 wherein the feedback means controls the means for supplying regulated direct current such that the current output from the rectifier is substantially constant.

5. A direct current power supply as in claim 4 wherein the means for supplying regulated directed current is a pulse width modulator.

6. A direct current power supply as in claim 5 wherein the rectifier is a diode bridge.

7. A power supply for a gas discharge device comprising,
a gas discharge device which is triggered at a relatively high voltage and maintained at a lower voltage,
a transformer having primary and secondary windings, the primary winding coupled to an alternate current source;
a first resonant circuit loop having said secondary winding and a capacitor as circuit elements therein, said first resonant circuit loop for developing said high voltage across said discharge device, and
a second resonant circuit loop having a capacitive reactance as a load for said discharge device and also having said secondary winding and said capacitor as circuit elements therein, said second resonant circuit loop for developing said lower voltage across said discharge device, whereby said second resonant circuit loop provides coarse control of current for the discharge device.

8. The power supply of claim 7 further comprising, means for sensing current in said discharge device and feeding back a signal proportional thereto for fine control of said current.

9. A power supply for a gas discharge device comprising:
a transformer having primary and secondary windings, the primary windings coupled to an alternate current source;
a first capacitor coupled to the secondary winding forming a first resonant circuit loop with said secondary winding at a time prior to downstream current use;
a second capacitor coupled to the secondary winding and downstream of the first capacitor, thereby forming a second resonant circuit loop with the secondary winding and the first capacitor during downstream current use;
a gas discharge device having a relatively high ionization voltage and a lower operating voltage, the discharge device coupled to the first and second resonant circuit loops, the first resonant circuit loop developing a voltage adequate to ionize the gas discharge device and the second resonant circuit loop providing a reactive load for the gas discharge device to maintain gas discharge, whereby the second resonant circuit loop provides a coarse control of current in the gas discharge device.

10. A power supply as in claim 9 wherein the second resonant circuit loop further comprises a rectifier having input and output terminals, the input terminals coupled to the first and second resonant circuit loops, the output terminals coupled to the gas discharge device thereby supplying direct current to the gas discharge device.

11. A power supply as in claim 9 further comprising:
means for sensing the current in the gas discharge device; and
feedback means for controlling the alternating current source in accordance with the sensed current so as to obtain a desired fine control of current in the gas discharge device.

12. A power supply as in claim 11 wherein the alternating current source comprises:
means for supplying regulated direct current; and
means for converting the regulated direct current to alternating current being supplied to the primary winding of the transformer, whereby the feedback means controls the means for supplying regulated direct current.

13. A power supply as in claim 12 wherein the current in the gas discharge device is direct current and wherein the second resonant circuit loop further comprises a rectifier having input and output terminals, the input terminals coupled to the first and second resonant circuit loops, the output terminals coupled to the gas discharge device thereby supplying direct current to the gas discharge device.

* * * * *